US009873221B2

(12) United States Patent
Kim et al.

(10) Patent No.: US 9,873,221 B2
(45) Date of Patent: Jan. 23, 2018

(54) 3-DIMENSIONAL PRINTER

(71) Applicant: LG ELECTRONICS INC., Seoul (KR)

(72) Inventors: Hyoungseok Kim, Seoul (KR); Kyujin Choi, Seoul (KR)

(73) Assignee: LG ELECTRONICS INC., Seoul (KR)

(*) Notice: Subject to any disclaimer, the term of this patent is extended or adjusted under 35 U.S.C. 154(b) by 150 days.

(21) Appl. No.: 14/826,008

(22) Filed: Aug. 13, 2015

(65) Prior Publication Data

US 2016/0046081 A1 Feb. 18, 2016

(30) Foreign Application Priority Data

Aug. 18, 2014 (KR) .................. 10-2014-0106917

(51) Int. Cl.
  *B29C 35/08* (2006.01)
  *B29C 41/02* (2006.01)
  (Continued)

(52) U.S. Cl.
  CPC .......... *B29C 47/92* (2013.01); *B29C 47/0014* (2013.01); *B29C 67/0055* (2013.01);
  (Continued)

(58) Field of Classification Search
  CPC ..... B29C 67/51; B29C 67/0062; B33Y 30/00; B33Y 40/00
  (Continued)

(56) References Cited

U.S. PATENT DOCUMENTS

2014/0044823 A1* 2/2014 Pax .................. B29C 47/12
  425/143
2015/0190963 A1* 7/2015 Lee .................. B29C 67/0059
  425/375

FOREIGN PATENT DOCUMENTS

JP         4076723      4/2008
KR       10-0771169    10/2007
(Continued)

OTHER PUBLICATIONS

PCT International Application No. PCT/KR2015/008562, Written Opinion of the International Sarching Authority dated Oct. 28, 2015, 6 pages.

*Primary Examiner* — Joseph S Del Sole
*Assistant Examiner* — Thukhanh T Nguyen
(74) *Attorney, Agent, or Firm* — Lee, Hong, Degerman, Kang & Waimey

(57) ABSTRACT

A 3-dimensional (3D) printer is disclosed. The 3D printer includes an extruder to extrude a filament into a cavity, a carriage to support the extruder, a moving unit to move the carriage, and a processor to control the extruder and the moving unit. The extruder includes a filament feeder to downwardly feed the filament, a heating unit to heat the filament fed by the filament feeder, a nozzle to output the heated filament into the cavity, a cooling unit to cool the filament feeder, to decrease heat transferred from the heating unit to the filament feeder, a first temperature sensor to sense a temperature of the heating unit, and a second temperature sensor to sense a temperature of the cooling unit. The processor controls the heating unit and the cooling unit, based on the first temperature sensor and the second temperature sensor, to enhance output speed of the filament.

17 Claims, 14 Drawing Sheets

(51) Int. Cl.
*B29C 47/92* (2006.01)
*B29C 67/00* (2017.01)
*B29C 47/00* (2006.01)
*B33Y 30/00* (2015.01)
*B33Y 50/02* (2015.01)

(52) U.S. Cl.
CPC ...... *B29C 67/0085* (2013.01); *B29C 67/0088* (2013.01); *B33Y 30/00* (2014.12); *B33Y 50/02* (2014.12)

(58) Field of Classification Search
USPC .......................................................... 425/375
See application file for complete search history.

(56) References Cited

FOREIGN PATENT DOCUMENTS

| | | |
|---|---|---|
| KR | 10-0837109 | 6/2008 |
| KR | 10-2012-0050408 | 5/2012 |
| KR | 10-1346704 | 12/2013 |

\* cited by examiner

3-DIMENSIONAL PRINTER

CROSS-REFERENCE TO RELATED APPLICATION

Pursuant to 35 U.S.C. §119(a), this application claims the benefit of earlier filing date and right of priority to Korean Patent Application No. 10-2014-0106917, filed on Aug. 18, 2014, the contents of which are hereby incorporated by reference herein in its entirety.

BACKGROUND OF THE INVENTION

1. Field of the Invention

The present invention relates to a 3-dimensional (3D) printer, and more particularly to a 3D printer capable of achieving an enhancement in output speed.

2. Description of the Related Art 3D printers build a solid object having a 3D shape by sequentially injecting a desired material, based on a 3D drawing, to successively build up finely thin layers.

Such a 3D printer is being developed and used for manufacture of a solid product. It may be possible to manufacture various solid products, using a 3D printer.

Meanwhile, there are attempts to enhance accuracy and surface finish of a product manufactured by a 3D printer.

SUMMARY OF THE INVENTION

It is an object of the present invention to provide a three-dimensional (3D) printer capable of achieving an enhancement in output speed.

In accordance with an aspect of the present invention, the above and other objects can be accomplished by the provision of a 3D printer including an extruder to extrude a filament into a cavity, a carriage to support the extruder attached thereto, a moving unit to move the carriage, and a processor to control the extruder and the moving unit, wherein the extruder includes a filament feeder to downwardly feed the filament supplied thereto, a heating unit to heat the filament fed by the filament feeder, a nozzle to output the heated filament into the cavity, a cooling unit to cool the filament feeder, to decrease heat transferred from the heating unit to the filament feeder, a first temperature sensor to sense a temperature of the heating unit, and a second temperature sensor to sense a temperature of the cooling unit, wherein the processor controls the heating unit and the cooling unit, based on the first temperature sensor and the second temperature sensor.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Hereinafter, the present invention will be described with reference to the drawings for explaining cell module assemblies according to embodiments of the present invention.

Although "module" or "unit" is suffixed to constituent elements described in the following description, this is intended only for ease of description of the specification. The suffixes themselves have no meaning or function to distinguish the constituent element using the suffix from the constituent element using no suffix. The suffixes "module" and "unit" may be used interchangeably.

Figure 1:
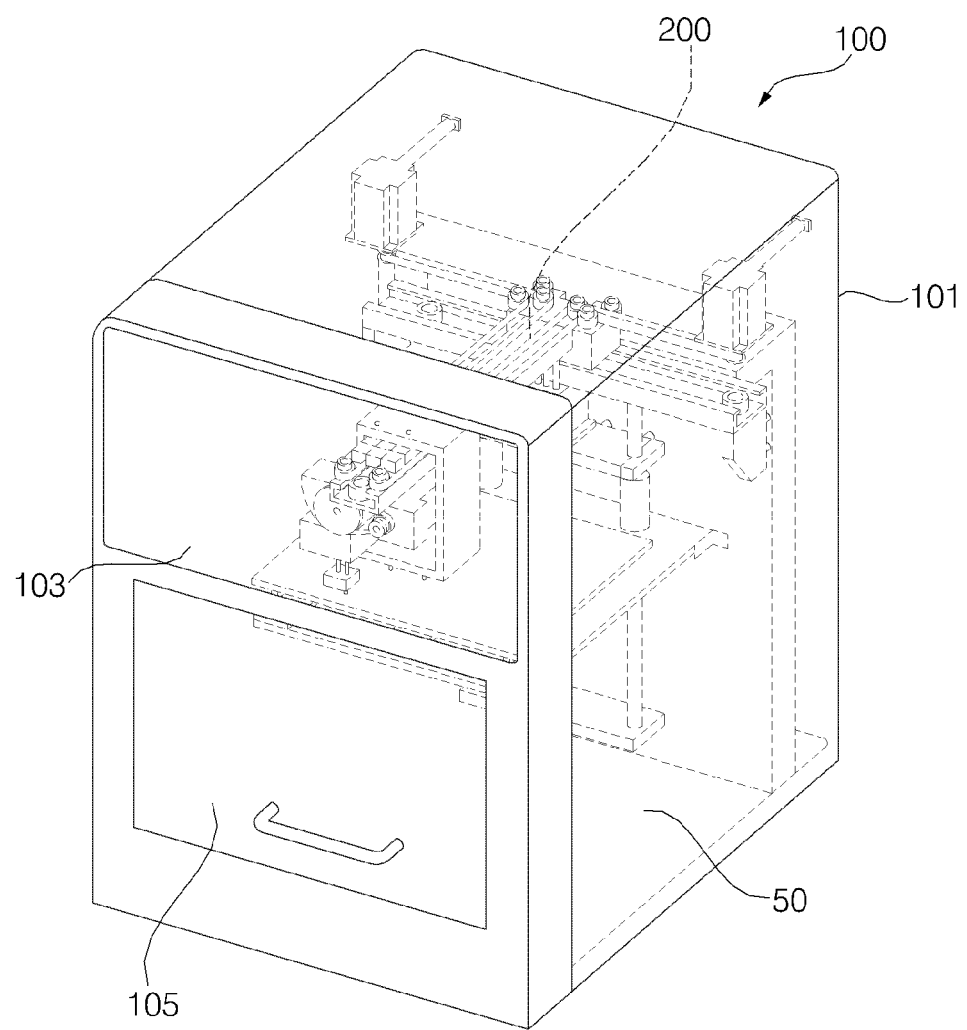
FIG. 1 is a view illustrating a 3-dimensional (3D) printer according to an embodiment of the present invention.

FIG. 1 is a view illustrating a 3-dimensional (3D) printer according to an embodiment of the present invention.

Referring to FIG. 1, the 3D printer according to the illustrated embodiment of the present invention, which is designated by reference numeral "100", may include a case 101 defining an appearance of the 3D printer 100, a cavity 50, that is, a space for formation of a model, and a moving device 200 disposed in the case 101, to move and output a material, for formation of a model. The 3D printer 100 may further include a door 105 for allowing a completed model to be discharged to the outside, a window 103 formed at the door 105, to allow the user to view the interior of the cavity 50, and a display (not shown) for displaying an operation state of the 3D printer or the like on the window 103.

Meanwhile, the printing system of the 3D printer described in this disclosure may be divided into a first system in which a filament made of a thermoplastic material such as acrylonitrilebutadiene-styrene copolymer resin (ABS) or polyamide is melted within a nozzle, and then solidified in the form of a thin film, to build up a multilayer structure, a second system in which a polymer material or metal powder is deposited through coating using a roller, and then sintered at a portion thereof corresponding to that of a product to be completed, to build up sintered layers, a third system in which a liquid-phase photocurable resin is contained in a chamber, and then cured, using laser light, ultraviolet light, digital light illumination (a projector), or the like, to fabricate an object, a fourth system in which a liquid-phase photocurable resin is injected, using an inkjet print head, and, at the same time, is cured, using ultraviolet light, and a fifth system in which an adhesive-coated material is cut into desired sections, using a laser beam, and the sections are layered one by one, to build up a multilayer structure.

The present invention will be described mainly in conjunction with the first system, namely, a method in which a filament made of a thermoplastic material such as ABS or polyamide is melted within a nozzle, and then solidified in the form of a thin film, to build up a multilayer structure.

In accordance with the first system, it may be possible to achieve a reduction in fabrication time, fabrication of products having various colors, weight reduction, and a reduction in manufacture costs because post-curing is unnecessary.

The moving device 200 according to the illustrated embodiment of the present invention may move a carriage 280 attached thereto on an x-y plane. Meanwhile, an extruder 300 (FIG. 2 or 3) is mounted to the carriage 280, to output a filament.

As the carriage 280 attached to the moving device 200 is moved on the x-y plane by the moving device 200, a melted filament is layered on a plate 115 (FIG. 2) within the cavity 50 in a sequential manner. Thus, a model desired by the user may be formed.

Meanwhile, the filament may be made of a thermoplastic resin such as ABS or polyamide (PLA).

Hereinafter, the moving device 200 will be described in more detail with reference to FIG. 2 and other drawings following FIG. 2.

Figure 2:
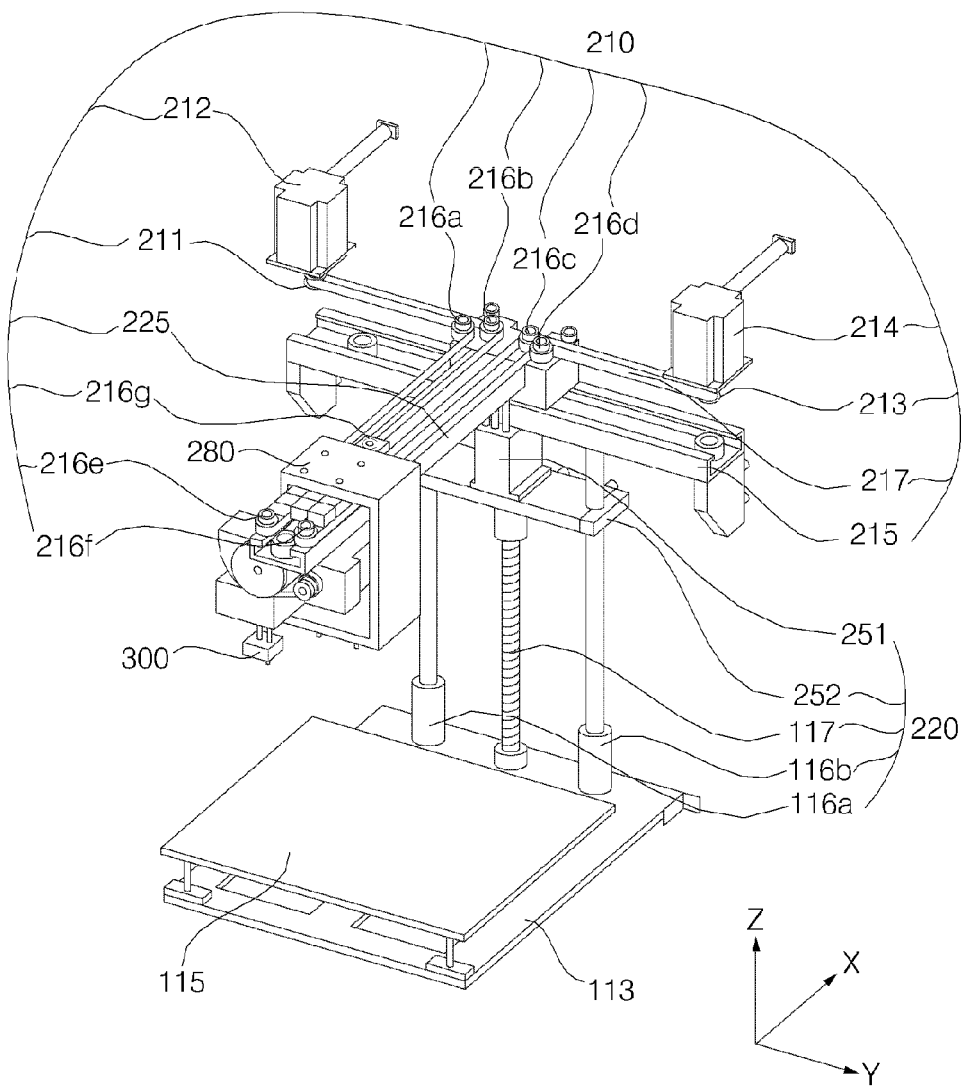
FIG. 2 is a perspective view illustrating an example of a moving device included in the 3D printer of FIG. 1.

FIG. 2 is a perspective view illustrating an example of the moving device included in the 3D printer of FIG. 1.

Referring to FIG. 2, the moving device 200 includes a support die 113, a platform 115 disposed on the support die 113, first and second guides 116a and 116b extending in a direction crossing the support die 113, namely, a vertical direction, and a vertical reciprocation shaft 117 disposed between the first guide 116a and the second guide 116b.

The moving device 200 may also include a drive motor 251 and a vertical reciprocation plate 252, which are disposed above the first and second guides 116a and 116b and vertical reciprocation shaft 117. The drive motor 251 is mounted on the vertical reciprocation plate 252. In accordance with operation of the drive motor 251, the vertical reciprocation plate 252 is movable in a z-axis direction along the first and second guides 116a and 116b and vertical reciprocation shaft 117, together with the drive motor 251.

Meanwhile, the drive motor 251 and vertical reciprocation plate 252 for z-axis driving may be referred to as a second moving unit 220 for executing a z-axis movement function of the moving device 200.

In addition, a frame 215 extending in a y-axis direction is disposed above the drive motor 251 and vertical reciprocation plate 252. An arm 225 extending in an x-axis direction is disposed above the frame 215 while crossing the frame 215.

The moving device 200 further includes drive motors 212 and 214 disposed at opposite ends of the frame 215, and timing pulleys 211 and 213 connected to respective motors 212 and 214.

Meanwhile, the moving device 200 also includes the carriage 280, which is mounted on the arm 225, to move in the x-axis direction. The moving device 200 further includes idlers 216a, 216b, 216c, and 216d mounted on the arm 225 in a region where the arm 225 crosses the frame 215, idlers 216e, 216f, and 216g, and a timing belt 217 extending around the idlers 216a to 216g, and timing pulleys 211 and 213, to transfer driving forces of the drive motors 212 and 214. The idler 216e and 216f are mounted to one end of the carriage 280, whereas the idler 216g is mounted to the other end of the carriage 280.

The timing belt 217 extends around the first timing pulley 211 mounted to the first drive motor 212, the idlers 216a, 216e, 216f, and 216d, the second timing pulley 213 mounted to the second drive motor 214, the idlers 216c, 216g, and 216b, and the first timing pulley 211 mounted to the first drive motor 212, in this order.

The movement direction and speed of the timing belt 217 are determined in accordance with rotation directions and speeds of the first and second drive motors 212 and 214. In accordance with rotation of the first and second drive motors 212 and 214, the arm 225 mounted on the frame 215 is movable in the y-axis direction, and the carriage 280 mounted on the arm 225 is movable in the x-axis direction.

In detail, in the moving device 200 of FIG. 2, the arm 225 moves in the y-axis direction when the first drive motors 212 and second drive motor 214 rotate in the same direction. On the other hand, when the first drive motors 212 and second drive motor 214 rotate in opposite directions, the carriage 280 arranged at the arm 225 in the moving device 220 moves in the x-axis direction. This will be described later with reference to FIGS. 3A to 3H.

Meanwhile, the drive motors 212 and 214, frame 215, arm 225, carriage 280, idlers 216a to 216g, timing pulleys 211 and 213, and timing belt 217 for x and y-axis driving may be referred to as a first moving unit 210 for executing an x and y-axis movement function of the moving device 200.

That is, the first moving unit 210 may include a frame extending in a first direction, for example, the frame 215, an arm disposed above the frame 215 extending in a second direction crossing the frame 215 while supporting the carriage 280, for example, the arm 225, the first and second drive motors 212 and 214 mounted on the frame 215 while being spaced from each other, the timing pulleys 211 and 213 connected to respective drive motors 212 and 214, the idlers 216a to 216g mounted on the arm 225, and the timing belt 271 extending around the timing pulleys 211 and 213.

In this case, the first moving unit 210 moves the arm 225 in the first direction when the first and second drive motors 212 and 214 rotate in the same direction. On the other hand, when the first and second drive motors 212 and 214 rotate in opposite directions, the first moving unit 210 moves the carriage 280 in the second direction.

On the other hand, when only one of the first and second drive motors 212 and 214 operates, the first moving unit 210 moves the carriage 280 in the second direction while moving the arm 225 in the first direction.

Meanwhile, in accordance with operation of the drive motor 251, the frame 215, arm 225, and carriage 280 are movable in the z-axis direction, together with the drive motor 251 and vertical reciprocation plate 252.

As described above, the extruder 300 is mounted to the carriage 280 mounted on the arm 225. Alternatively, a bracket (not shown) may be connected between the carriage 280 and the extruder 300, differently than the illustrated case.

Differently than the illustrated case, the second driving unit 220 may move the plate 115 in the z-axis direction without moving the drive motor 251 and vertical reciprocation plate 252.

Meanwhile, the moving device 200 according the embodiment of the present invention may achieve movement of the carriage 280 in an x-y plane, using a single arm, namely, the arm 225. In particular, the moving device 200 may simultaneously achieve x-axis movement and y-axis movement in accordance with operation of at least one of the two drive motors. As a result, it may be possible to form a model having a smoother surface.

FIGS. 3A to 3H are views explaining operation of the moving device illustrated in FIG. 2.

Figure 3A:
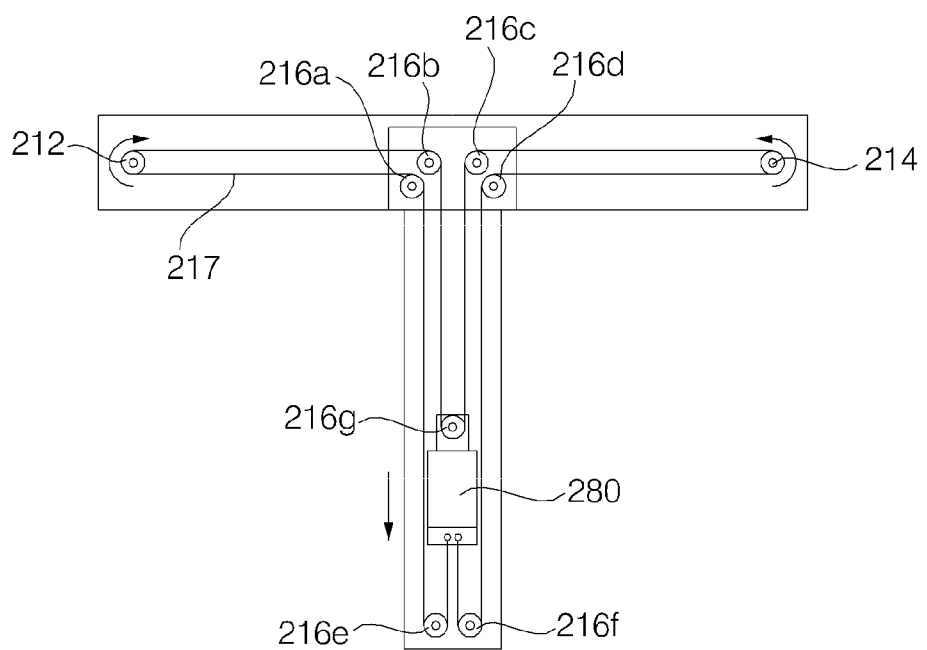
FIGS. 3A to 3H are views explaining operation of the moving device illustrated in FIG. 2.
Figure 3B:
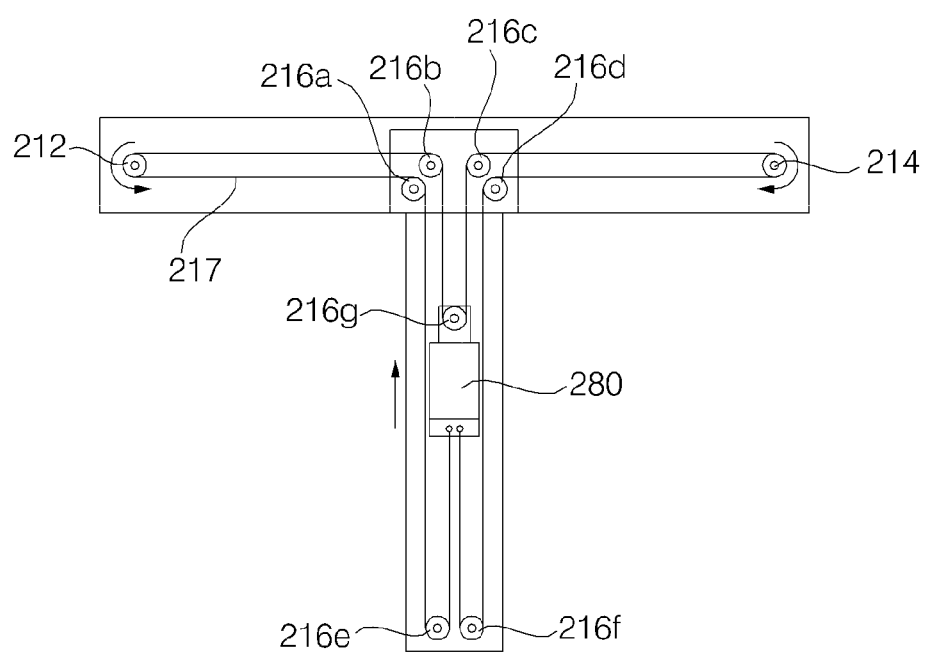

First, FIGS. 3A and 3B illustrate x-axis movement of the carriage 280.

FIG. 3A illustrates forward movement of the carriage 280 when the first drive motor 212 rotates in a right direction, and the second drive motor 214 rotates in a left direction. That is, FIG. 3A illustrates movement of the carriage 280 in a direction away from the frame 215.

FIG. 3B illustrates backward movement of the carriage 280 when the first drive motor 212 rotates in the left direction, and the second drive motor 214 rotates in the right direction. That is, FIG. 3A illustrates movement of the carriage 280 in a direction toward the frame 215.

Figure 3C:
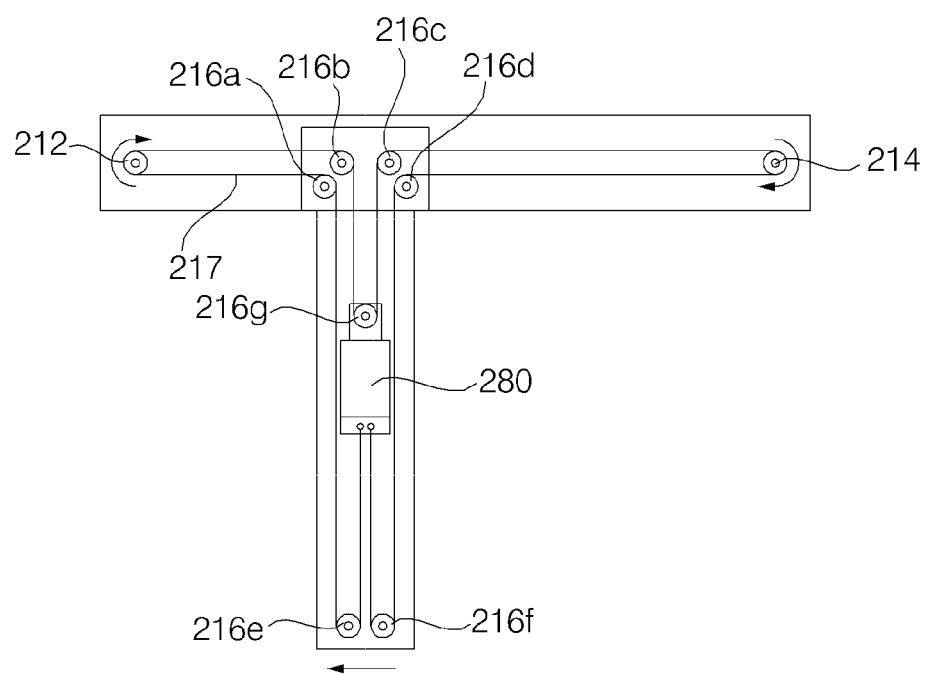
Figure 3D:
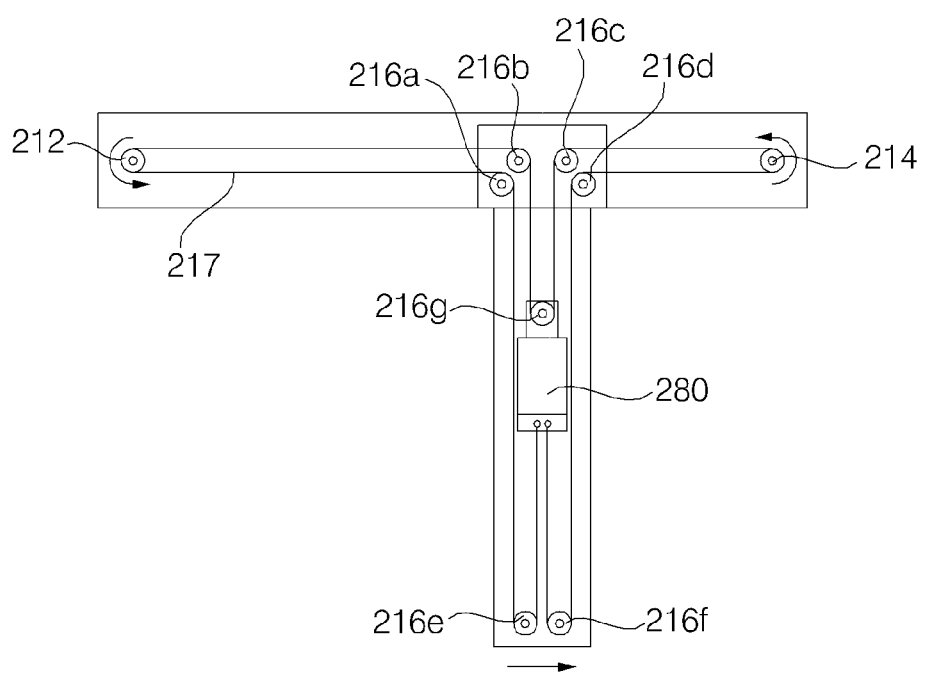

Next, FIGS. 3C and 3D illustrate y-axis movement of the arm 225.

FIG. 3C illustrates leftward movement of the arm 225 when both the first drive motor 212 and the second drive motor 214 rotate in the right direction. That is, FIG. 3C illustrates movement of the arm 225 in a direction toward the first drive motor 212.

FIG. 3D illustrates rightward movement of the arm 225 when both the first drive motor 212 and the second drive motor 214 rotate in the left direction. That is, FIG. 3D illustrates movement of the arm 225 in a direction toward the second drive motor 214.

Next, FIGS. 3E to 3H illustrate x-axis movement of the carriage 280 and y-axis movement of the arm 225.

Figure 3E:
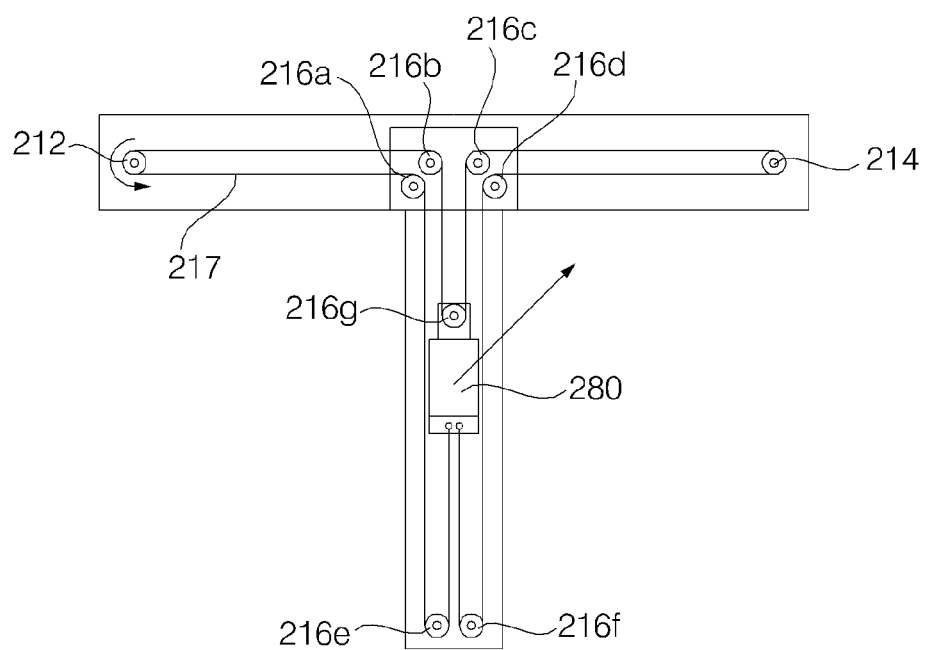

FIG. 3E illustrates movement of the carriage 280 in right and upward directions when the first drive motor 212 rotates in the left direction under the condition that the second drive motor 214 is stopped. That is, FIG. 3E illustrates rightward movement of the arm 225, and backward movement of the carriage 280 carried out simultaneously with the rightward movement of the arm 225. In this case, accordingly, the carriage 280 moves in a 45° direction.

Figure 3F:
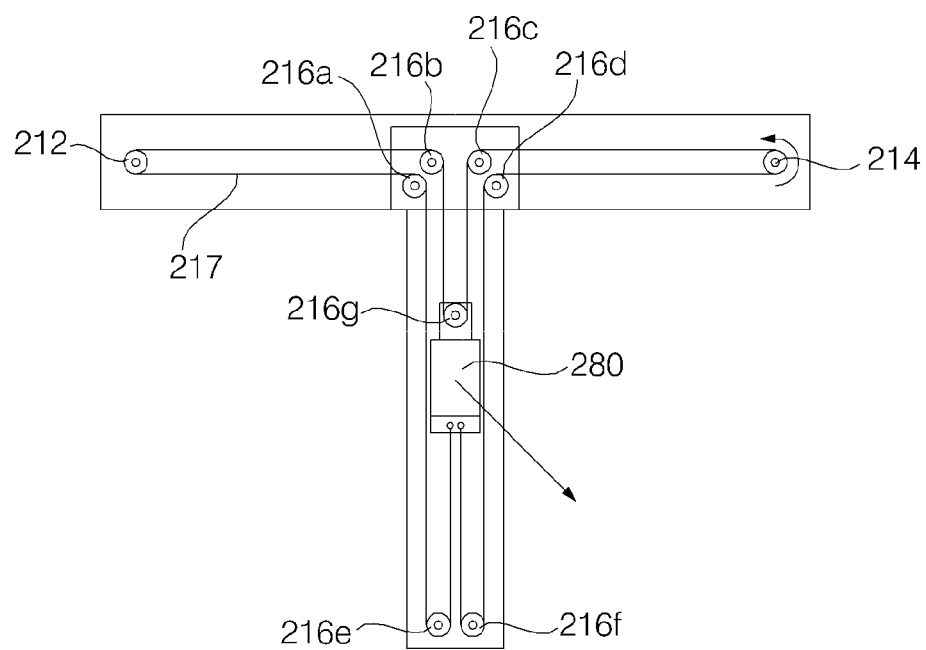

FIG. 3F illustrates movement of the carriage 280 in right and downward directions when the second drive motor 214 rotates in the right direction under the condition that the first drive motor 212 is stopped. That is, FIG. 3F illustrates rightward movement of the arm 225, and forward movement of the carriage 280 carried out simultaneously with the rightward movement of the arm 225. In this case, accordingly, the carriage 280 moves in a 135° direction.

Figure 3G:
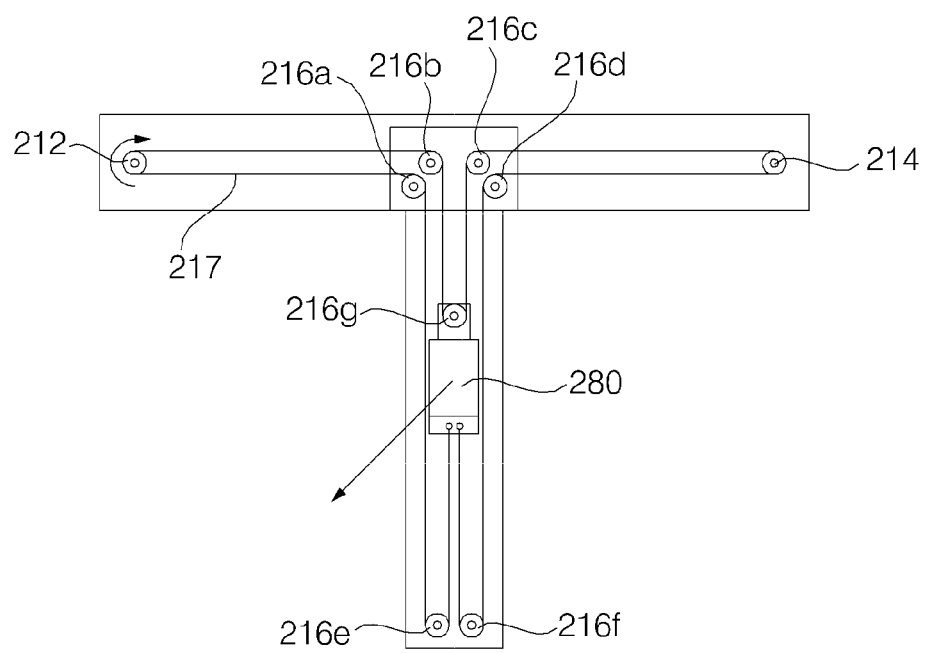

FIG. 3G illustrates movement of the carriage 280 in left and downward directions when the first drive motor 212 rotates in the right direction under the condition that the second drive motor 214 is stopped. That is, FIG. 3G illustrates leftward movement of the arm 225, and forward movement of the carriage 280 carried out simultaneously with the leftward movement of the arm 225. In this case, accordingly, the carriage 280 moves in a 225° direction.

Figure 3H:
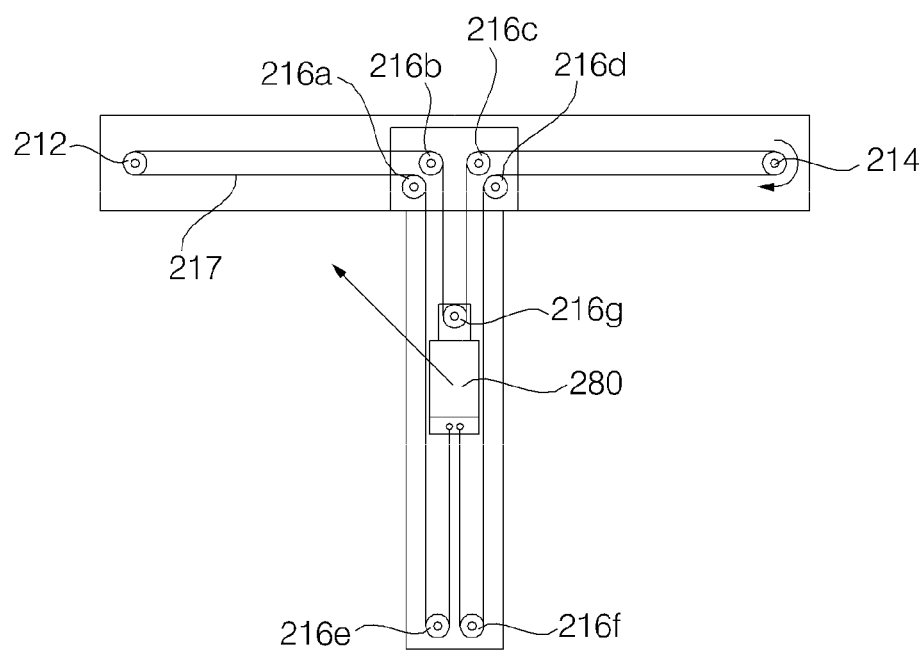

FIG. 3H illustrates movement of the carriage 280 in left and upward directions when the second drive motor 214 rotates in the right direction under the condition that the first drive motor 212 is stopped. That is, FIG. 3H illustrates leftward movement of the arm 225, and backward movement of the carriage 280 carried out simultaneously with the leftward movement of the arm 225. In this case, accordingly, the carriage 280 moves in a 315° direction.

Meanwhile, the moving device 200 according the embodiment of the present invention may achieve movement of the carriage 280 in an x-y plane, using a single arm, namely, the arm 225. In particular, as illustrated in FIGS. 3E to 3H, the moving device 200 may simultaneously achieve x-axis movement and y-axis movement in accordance with operation of at least one of the two drive motors. As a result, it may be possible to form a model having a smoother surface.

Figure 4:
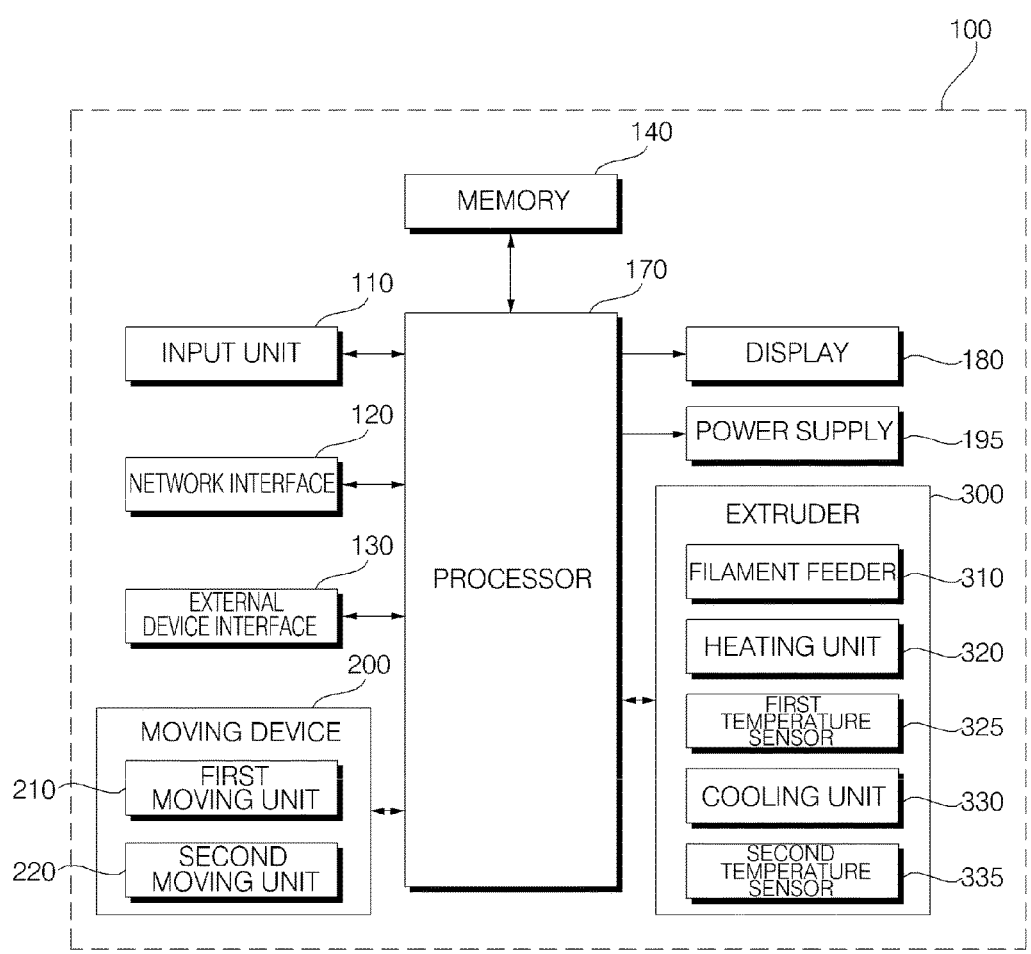
FIG. 4 is a block diagram illustrating an inner configuration of the 3D printer illustrated in FIG. 1.

FIG. 4 is a block diagram illustrating an inner configuration of the 3D printer illustrated in FIG. 1.

Referring to FIG. 4, the 3D printer 100 may include an input unit 110, a network interface 120, an external device interface 130, a memory 140, a processor 170, a display 180, and a power supply 195, in addition to the moving device 200 and extruder 300.

The input unit 110 sends a signal input by the user to the processor 170. For this function, operating buttons may be provided at the input unit 110. For example, the input unit 110 may send, to the processor 170, a power-on signal through operation of a power-on button, a start signal through operation of a start button, a temporary stop signal through operation of a temporary stop button, or the like.

The network interface 120 provides an interface for connecting the 3D printer 100 to a network through a wired/wireless data communication system. For example, the network interface 120 provides an interface connectable to a mobile terminal or a personal computer (PC) and, as such, may exchange data with the mobile terminal or PC in a wired/wireless manner. In addition, the network interface 120 may exchange data with an external server (not shown) via the network. Meanwhile, as the wireless communication system, various data communication systems such as Bluetooth, Wi-Fi Direct, Wi-Fi, DLNA, and APiX may be used.

For example, the 3D printer 100 may receive a 3D image for formation of a 3D model from a PC or mobile terminal connected thereto in a wired/wireless manner via the network interface 120.

The external device interface 130 provides an interface for exchange of data with an external device through an input terminal such as USB or HDMI. For example, the 3D printer 100 may receive a 3D image for formation of a 3D model from an external device, for example, a USB, in a wired/wireless manner via the external device interface 130.

The memory 140 may store a program for various signal processing and control of the processor 170, and a processed image, audio, or data signal.

In addition, the memory 140 may execute a function for temporarily storing an image, audio, or data signal input from the external device interface 130.

The processor 170 may control each unit of the 3D printer 100.

Meanwhile, the processor 170 controls the moving device 100 and extruder 300, to produce a 3D model, based on a 3D image input from the network interface 120 or external device interface 130.

In detail, as illustrated in FIGS. 3A to 3H, the processor 170 may control the first and second drive motors 212 and 214, to move the moving device 200 in the x and y-axis directions. That is, the processor 170 may control the first and second drive motors 212 and 214 included in the first moving unit 210.

For example, the processor 170 may move the arm 225 in the first direction by rotating the first and second drive motors 212 and 214 in the same direction. On the other hand, the processor 170 may move the carriage 280 on the arm 225 in the second direction by rotating the first and second drive motors 212 and 214 in opposite directions.

In another example, the processor 170 moves the carriage 280 in the second direction while moving the arm 225 in the first direction by rotating only one of the first and second drive motors 212 and 214.

In addition, the processor 170 may control the drive motor 251 of the second moving unit 220, to move the moving device 200 in the z-axis direction.

Meanwhile, the processor 170 may control filament movement speed, etc. of the extruder 300. The filament movement speed may be determined in accordance with temperature of the extruder 300. For example, the filament movement speed may be increased at a higher temperature of the extruder 300.

In order to control filament movement speed, etc. of the extruder 300, the processor 170 may control a filament feeder 310, a heating unit 320, and a cooling unit 330, which are included in the extruder 300.

To this end, the processor 170 may receive a temperature sensed by a first temperature sensor 325 to sense temperature of the heating unit 320, and a temperature sensed by a second temperature sensor 335 to sense temperature of the cooling unit 330.

The processor 170 may control the heating unit 320 and cooling unit 330, based on sensing results from the first and second temperature sensors 325 and 335.

For example, the processor 170 controls the heating unit 320, to increase temperature of the heating unit 320 to a target heating temperature, and controls the cooling unit 330 to decrease temperature of the cooling unit 330 to a target cooling temperature.

Meanwhile, the processor 170 may temporarily decrease the target heating temperature when temperature of the cooling unit 330 exceeds the target cooling temperature.

In addition, the processor 170 may stop operation of the filament feeder 310 when the temperature sensed by the second temperature sensor 335 is equal to or higher than a predetermined temperature.

Meanwhile, the processor may control at least one of the heating unit 320 and cooling unit 330 such that the difference between the temperature sensed by the first temperature sensor 325 and the temperature sensed by the second temperature sensor 335 is within a predetermined range.

In addition, the processor may execute a control operation to decrease filament movement speed of the filament feeder 310 when temperature of the heating unit 320 increases. In detail, the processor 170 may execute a control operation to temporarily decrease filament movement speed of the filament feeder 310 when temperature of the heating unit 320 exceeds the target heating temperature, because filament movement speed may become excessively high.

Alternatively, the processor 170 may execute a control operation to decrease temperature of the cooling unit 330 when temperature of the heating unit 320 increases. In detail, the processor 170 may execute a control operation to temporarily decrease temperature of the cooling unit 330 when temperature of the heating unit 320 increases, in order to reduce heat transferred to the filament feeder 310.

The display 180 may display information associated with operation of the 3D printer 100. For display of information, the display 180 may be implemented as a PDP, an LCD, or an OLED.

The power supply 195 may supply power required for operation of each constituent element under the control of the processor 170. In particular, the power supply 195 may supply power to the processor 170, which may be implemented in the form of a system-on-chip (SOC), and the display 180, which displays information. To this end, the power supply 195 may include a converter for converting AC power applied thereto into DC power, and a DC/DC converter for level-converting the DC power.

Figure 5:
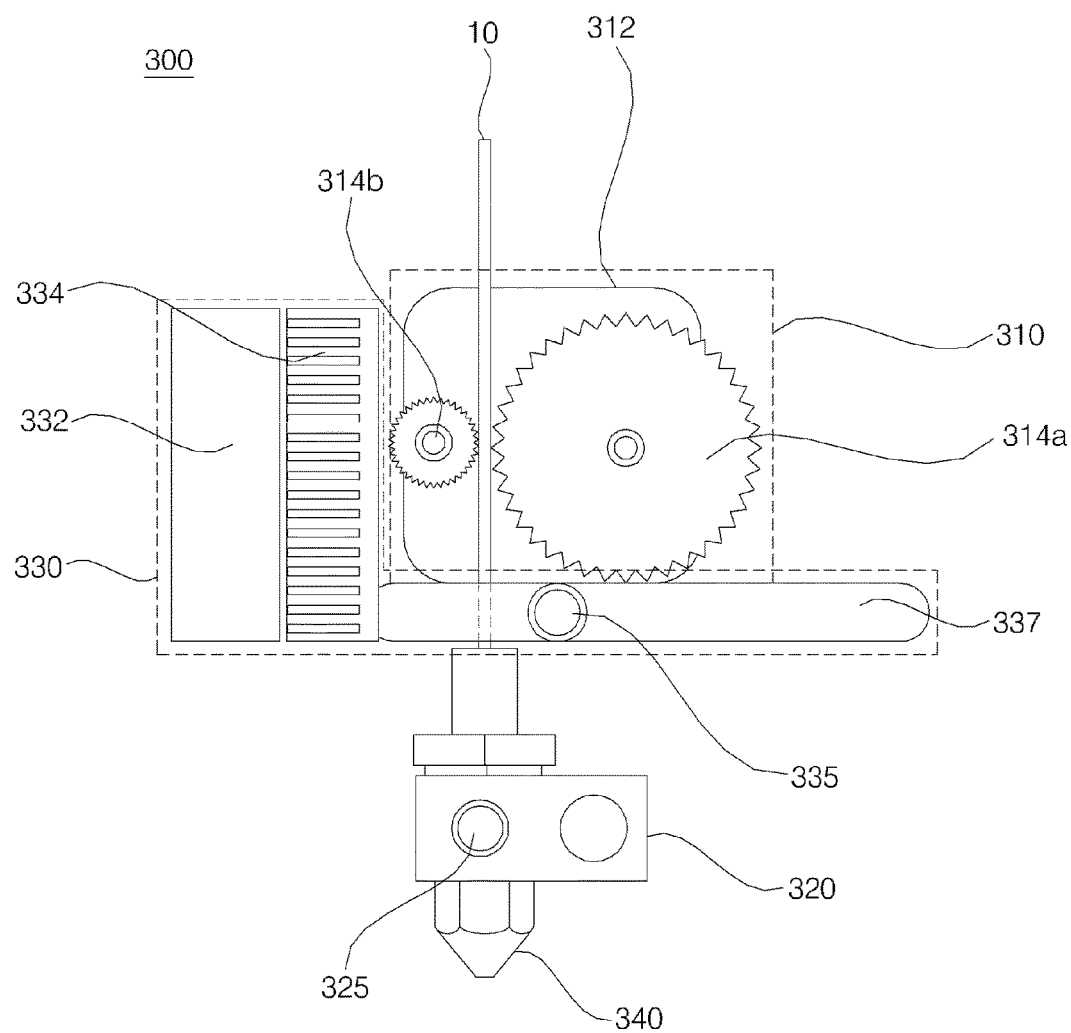
FIG. 5 is a view illustrating an example of the extruder of FIG. 2.

FIG. 5 illustrates an example of the extruder of FIG. 2.

Referring to FIG. 5, the extruder 300, which is attached to the carriage 280, includes the filament feeder 310, which downwardly feeds a filament, the heating unit 320, which heats the filament fed by the filament feeder 310, a nozzle 340, which outputs the heated filament into the cavity 50, and the cooling unit 330, which cools the filament feeder 310, to prevent heat from the heating unit 320 from being transferred to the filament feeder 310 or the vicinity thereof.

The extruder 300 may further include the first temperature sensor 325 to sense temperature of the heating unit 320, and the second temperature sensor 335 to sense temperature of the cooling unit 330.

The filament feeder 310 may include a drive motor 312 to move the filament 10 in a downward direction, that is, toward the heating unit 320, and gears 314a and 314b driven by the drive motor 312. In accordance with rotation of the gears 314a and 314b, the filament, which is in a solid phase, and is designated by reference numeral "10", is downwardly moved along a movement path.

Meanwhile, the heating unit 320 heats the filament 10 fed thereto by the filament feeder 310. To this end, the heating unit 320 may include a heater (not shown) and a heater driver (not shown). In addition, the first temperature sensor 325 may be disposed in the heater 320. The temperature sensed by the first temperature sensor 325 is sent to the processor 170.

The nozzle 340 outputs the filament 10 heated by the heating unit 320 into the cavity 50. In particular, as described above, a model having a desired shape may be produced in accordance with x and y-axis movement of the carriage 280.

Although operation speed of the filament feeder 310 is important for rapid filament supply, cooling the filament fed in accordance with operation of the filament feeder 310 is also an important factor.

It is also desirable to provide the cooling unit 330 in order to prevent transfer of heat to the filament feeder 310 or the vicinity thereof during heating operation of the heating unit 320.

The cooling unit 330 may include a heat dissipation member 334 contacting the filament feeder 310, and a cooling fan 332 for cooling the heat dissipation member 334.

The cooling fan 332 operates under the control of the processor 170. An air flow path extending toward the heat dissipation member 334 may be established in accordance with operation of the cooling fan 332. The heat dissipation member 334 may include a heat dissipation plate.

Meanwhile, the cooling unit 330 may further include a base 337 contacting the heater 320. The base 337 may be disposed above the heater 320 while being disposed near lower portions of the heat dissipation member 334 and cooling fan 332.

The base 337 may be made of a metal having high thermal conductivity. For example, the base 337 may be made of aluminum.

In order to control operation of the cooling fan 332, it is necessary to sense a temperature in the vicinity of the cooling unit 330. In the illustrated embodiment of the present invention, the second temperature sensor 335 to sense temperature of the cooling unit 330 is disposed in the extruder 300.

In detail, the second temperature sensor 335 may be disposed at the base 337. The sensed temperature is sent to the processor 170.

The processor 170 controls the heating unit 320, based on the temperature sensed by the first temperature sensor 325, such that temperature of the heating unit 320 increases to the target heating temperature. The processor 170 also controls the cooling unit 330, based on the temperature sensed by the second temperature sensor 335, such that temperature of the cooling unit 330 decreases to the target cooling temperature.

In detail, the processor 170 controls, based on a first temperature sensed by the first temperature sensor 325, operation time of the heater (not shown) such that temperature of the heating unit 320 increases to the target heating temperature. The processor 170 also controls operation time and rotation speed of the cooling fan 332, based on a second temperature sensed by the second temperature sensor 335, such that temperature of the cooling unit 330 decreases to the target cooling temperature.

Based on the continuously sensed first and second temperatures, the processor 170 controls the heating unit 320 to be maintained at the target heating temperature, while controlling the cooling unit 330 to be maintained at the target cooling temperature or below.

The processor 170 may temporarily stop the heater (not shown) when the heating unit 320 is maintained at the target heating temperature. For example, the processor 170 may temporarily stop the heater (not shown) when the heating unit 320 is maintained at the target heating temperature for a first period.

Meanwhile, the processor 170 may temporarily stop the cooling fan 332 when the cooling unit 330 is maintained at the target cooling temperature for a second period.

When temperature of the cooling unit 330 exceeds the target cooling temperature, the processor 170 may temporarily decrease the target heating temperature.

Alternatively, when temperature of the cooling unit 330 is equal to or higher than the target cooling temperature for a predetermined time or longer or exceeds a maximum allowable temperature, the processor 170 may stop operation of the filament feeder 310. When a temperature of the cooling unit 330 subsequently decreases to the target cooling temperature or below, the processor 170 controls the filament feeder 310 to again operate.

Meanwhile, the processor 170 may control at least one of the heating unit 320 and cooling unit 330 such that the difference between the temperature sensed by the first temperature sensor 325 and the temperature sensed by the second temperature sensor 335 is within a predetermined range, in order to output the filament through the nozzle 340 in a stably heated state.

On the other hand, the processor 170 may execute a control operation to decrease movement speed of the filament feeder 310 as temperature of the heating unit 320 increases. In detail, when temperature of the heating unit 320 increases to be higher than the target heating temperature, movement speed of the filament is too fast. In this case, accordingly, the processor 170 may control the filament feeder 310 such that filament movement speed of the filament feeder 310 is temporarily decreased.

Alternatively, the processor 170 may execute a control operation to decrease temperature of the cooling unit 330 as temperature of the heating unit 320 increases. In detail, the processor 170 may control the cooling unit 330 such that temperature of the cooling unit 330 is temporarily decreased, in order to reduce heat transferred to the filament feeder 310 as temperature of the heating unit 320 increases.

Thus, it may be possible to stably enhance output speed of the filament by controlling the heating unit 320 and cooling unit 330, using the first temperature sensor 325 to sense temperature of the heating unit 320 and the second temperature sensor 335 to sense temperature of the cooling unit 330. Accordingly, it may be possible to reduce production time when a model is produced, using the 3D printer 100.

Figure 6:
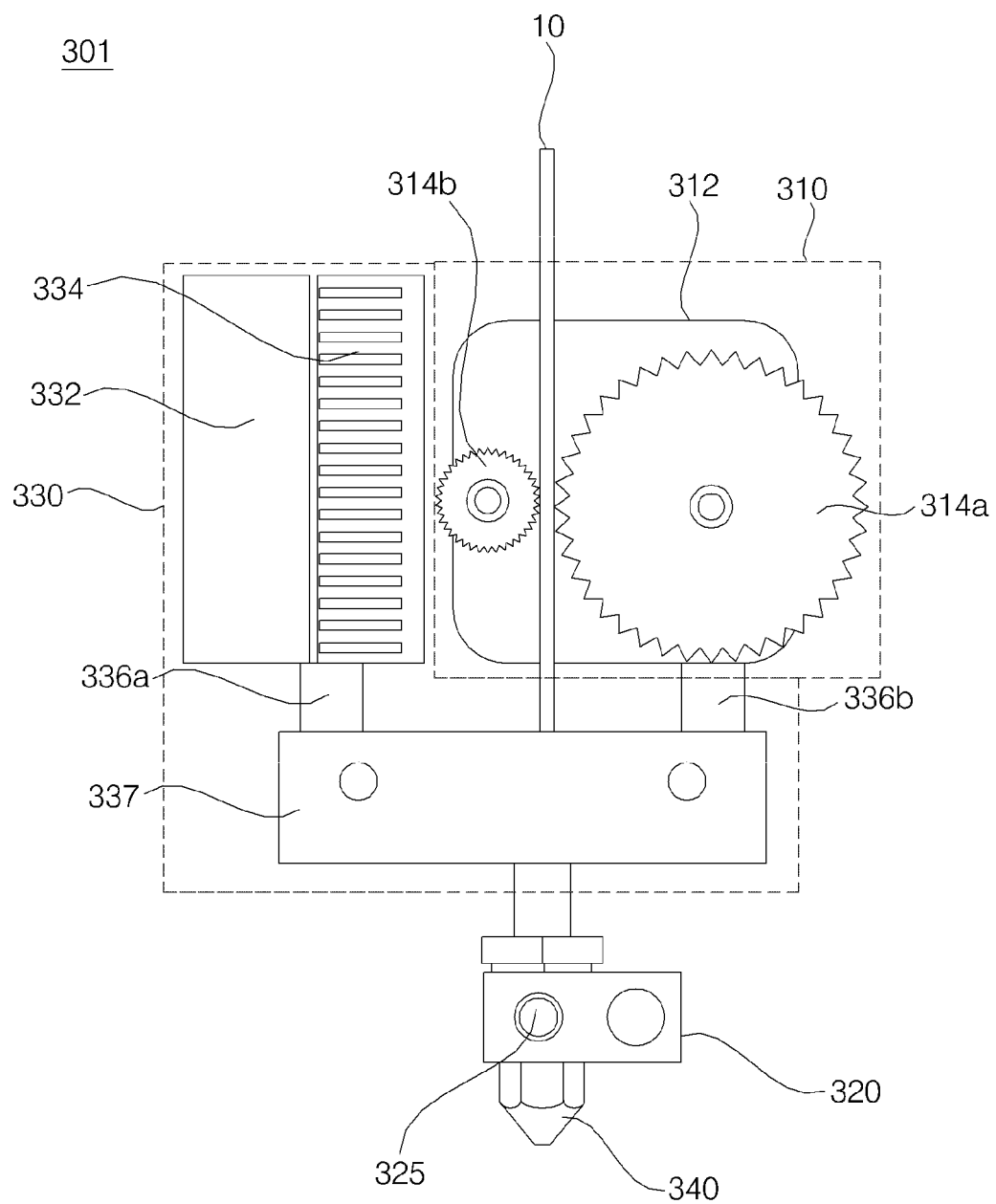
FIG. 6 is a view illustrating another example of the extruder of FIG. 2.

FIG. 6 illustrates another example of the extruder illustrated in FIG. 2.

The extruder of FIG. 6, which is designated by reference numeral "301", is similar to the extruder 300 of FIG. 5, except that the cooling unit 300 further includes bridges 336a and 336b.

That is, the extruder 301 differs from the extruder 300 in that the bridges 336a and 336b are disposed between the base 337 and the cooling fan 332 and heat dissipation member 334 and, as such, the base 337 is spaced from the cooling fan 332 and heat dissipation member 334 without contact.

In this case, the second temperature sensor 335 is disposed at the base 337. Similarly to the previous case, the processor 170 controls the heating unit 320 and cooling unit 330, using the first temperature sensor 325 to sense temperature of the heating unit 320 and the second temperature sensor 335 to sense temperature of the cooling unit 330. As a result, it may be possible to stably enhance output speed of the filament. Accordingly, it may be possible to reduce production time when a model is produced, using the 3D printer 100. By virtue of the bridges 336a and 336b, heat transferred from the heating unit 320 to the filament feeder 310 is more effectively reduced.

Figure 7:
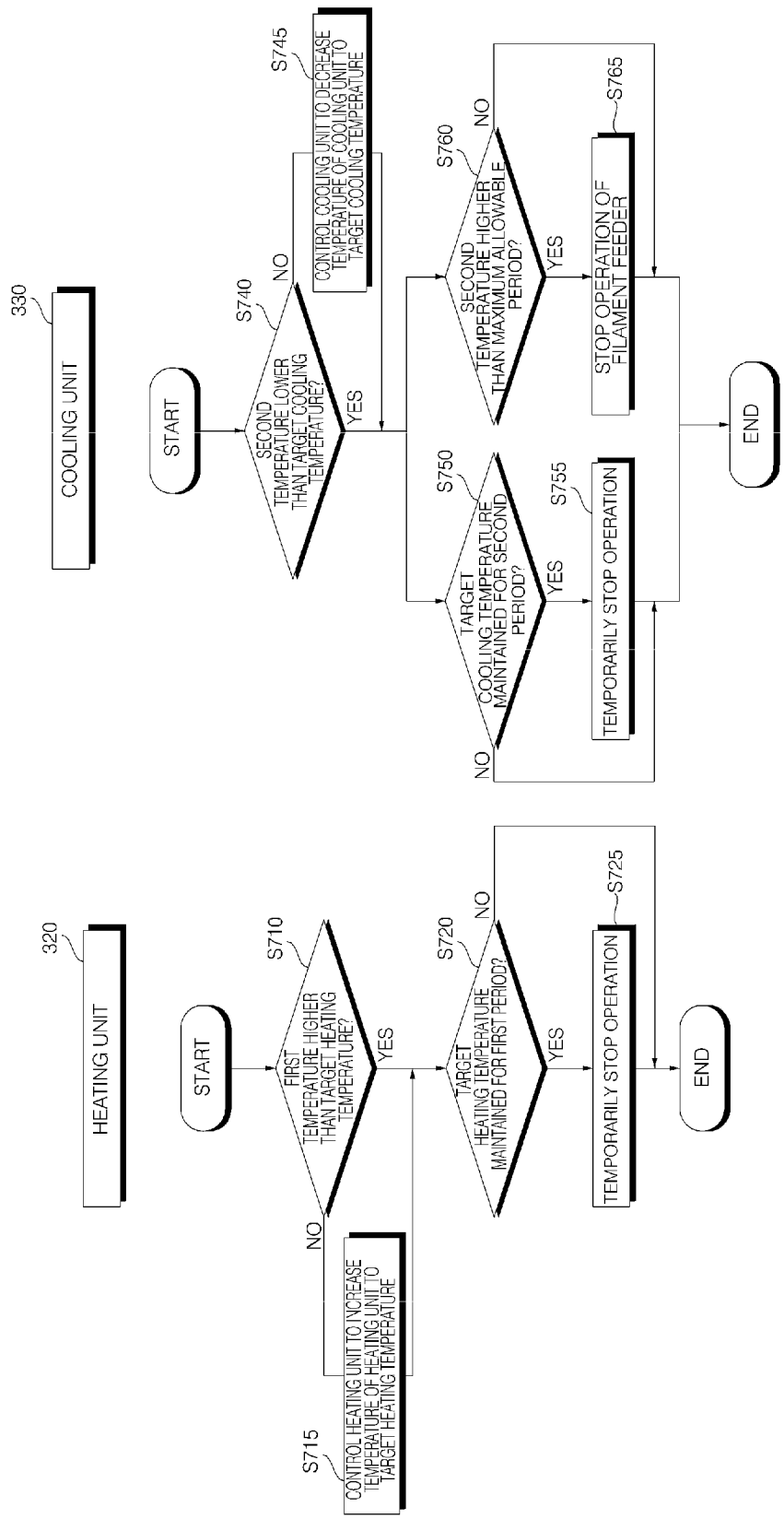
FIG. 7 is a flowchart illustrating an operation method of the extruder.

FIG. 7 is a flowchart illustrating an operation method of the extruder.

First, operation of the heating unit 310 in the extruder 300 will be described. The processor 170 determines whether the first temperature sensed by the first temperature sensor 325 is higher than the target heating temperature (S710). If no, the processor 170 controls the heating unit 320 such that temperature of the heating unit 320 increases to the target heating temperature (S715). For example, the processor 170 operates the heater (not shown) in the heating unit 320.

On the other hand, if yes at S710 or after execution of S715, the processor 170 determines, based on the first temperature sensed by the first temperature sensor 325, whether the heating unit 320 is maintained at the target heating temperature for the first period (S720). If yes at S720, the processor 170 may temporarily stop operation of the heating unit 320. That is, the processor 170 may temporarily stop operation of the heater (not shown) (S725).

Next, operation of the cooling unit 330 in the extruder 300 will be described. The processor 170 determines whether the second temperature sensed by the second temperature sensor 335 is lower than the target cooling temperature (S740). If no at S740, the processor 170 controls the cooling unit 330 such that temperature of the cooling unit 330 decreases to the target cooling temperature (S745). For example, the processor 170 operates the cooling fan 332 of the cooling unit 330.

On the other hand, if yes at S740 or after execution of S745, the processor 170 determines, based on the second temperature sensed by the second temperature sensor 335, whether the cooling unit 330 is maintained at the target cooling temperature for the second period (S750). If yes at S750, the processor 170 may temporarily stop operation of the cooling unit 330. That is, the processor 332 may temporarily stop operation of the cooling fan 332 (S755).

On the other hand, if yes at S740 or after execution of S745, the processor 170 also determines whether the second temperature sensed by the second temperature sensor 335 is higher than the maximum allowable temperature (S760). If yes at S760, the processor 170 may stop operation of the filament feeder 310 (S765). In accordance with this control operation, it may be possible to stably enhance output speed of the filament.

Meanwhile, the operation method of the 3D printer according to the present invention can be realized as code, which can be written on a recording medium that can be read by a processor equipped in the motor driving device or air conditioner and can be read by a processor. The recording medium that can be read by a processor includes all kinds of recording media, on which data that can be read by a processor is written, such as a read only memory (ROM), a random access memory (RAM), a CD-ROM, a magnetic tape, a floppy disk, an optical data storage, and a carrier wave type (e.g., transmission over the Internet). The recording medium that can be read by a processor can be distributed to computer systems connected to one another on a network, and codes that can be read by a processor can be stored in the recording medium in a distributed manner and executed.

As apparent from the above description, the 3D printer according to each embodiment of the present invention may an increase in filament output speed through a configuration including an extruder to extrude a filament into a cavity, a carriage to support the extruder attached thereto, a moving unit to move the carriage, and a processor to control the extruder and the moving unit, wherein the extruder includes a filament feeder to downwardly feed the filament supplied thereto, a heating unit to heat the filament fed by the filament feeder, a nozzle to output the heated filament into the cavity, a cooling unit to cool the filament feeder, to decrease heat transferred from the heating unit to the filament feeder, a first temperature sensor to sense a temperature of the heating unit, and a second temperature sensor to sense a temperature of the cooling unit, wherein the processor controls the heating unit and the cooling unit, based on the first temperature sensor and the second temperature sensor.

In addition, the moving device in the 3D printer according to each embodiment of the present invention may achieve movement of the carriage in an x-y plane, using a single arm structure. In particular, the moving device may simultaneously achieve x-axis movement and y-axis movement in accordance with operation of at least one of the two drive motors. As a result, it may be possible to form a model having a smoother surface.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A 3-dimensional printer, comprising:
   an extruder to extrude a filament into a cavity;
   a carriage coupled to the extruder and to support the extruder;
   a moving unit to move the carriage; and
   a processor to control the extruder and the moving unit, wherein the extruder comprises:
      a filament feeder to feed the filament supplied to the filament feeder;
      a heating unit to heat the filament fed by the filament feeder;
      a nozzle to output the heated filament into the cavity;
      a cooling unit to cool the filament feeder to decrease heat transferred from the heating unit to the filament feeder;
      a first temperature sensor to sense a temperature of the heating unit; and
      a second temperature sensor to sense a temperature of the cooling unit, and
   wherein the processor controls the heating unit and the cooling unit based on the temperatures sensed by the first temperature sensor and the second temperature sensor,
   wherein the moving unit comprises:
      a frame extending in a first direction;
      an arm disposed above the frame and extending in a second direction that crosses the first direction, the carriage disposed at the arm; and
      a first drive motor and a second drive motor disposed at the frame such that the first drive motor and the second drive motor are spaced from each other, and
   wherein the moving unit:
      moves the carriage in the first direction when the first and second drive motors rotate in a same direction;
      moves the carriage on the arm in the second direction when the first and second drive motors rotate in opposite directions; and
      moves the carriage in a third direction between the first direction and the second direction when one of the first and second drive motors is operated and the other first and second drive motors is stopped.

2. The 3-dimensional printer according to claim 1, wherein the processor:
   controls the heating unit to increase the temperature of the heating unit to a target heating temperature; and
   controls the cooling unit to decrease the temperature of the cooling unit to a target cooling temperature.

3. The 3-dimensional printer according to claim 2, wherein the processor stops an operation of the filament feeder when the temperature sensed by the second temperature sensor exceeds a maximum allowable temperature or when the temperature sensed by the second temperature sensor is equal to or higher than the target cooling temperature for at least a predetermined period of time.

4. The 3-dimensional printer according to claim 1, wherein the processor controls at least the heating unit or the cooling unit such that a difference between the temperature sensed by the first temperature sensor and the temperature sensed by the second temperature sensor is within a predetermined range.

5. The 3-dimensional printer according to claim 2, wherein the processor decreases the target heating temperature temporarily when the temperature of the cooling unit is higher than the target cooling temperature.

6. The 3-dimensional printer according to claim 2, wherein the processor stops an operation of the heating unit temporarily when the temperature sensed by the first temperature sensor is maintained at the target heating temperature for a first period of time.

7. The 3-dimensional printer according to claim 6, wherein the processor stops an operation of the cooling unit temporarily when the temperature sensed by the second temperature sensor is maintained at the target cooling temperature for a second period of time.

8. The 3-dimensional printer according to claim 1, wherein the processor executes a control operation to decrease a filament movement speed of the filament feeder when the temperature of the heating unit increases.

9. The 3-dimensional printer according to claim 1, wherein the processor executes a control operation to decrease the temperature of the cooling unit when the temperature of the heating unit increases.

10. The 3-dimensional printer according to claim 1, wherein the cooling unit comprises:
   a heat dissipation member contacting the filament feeder;
   a cooling fan to cool the heat dissipation member; and
   a base contacting the heating unit.

11. The 3-dimensional printer according to claim 10, wherein the second temperature sensor is disposed in the base.

12. The 3-dimensional printer according to claim 10, wherein the cooling unit further comprises a bridge disposed between the base and the cooling fan or between the base and the heat dissipation member.

13. The 3-dimensional printer according to claim 1, wherein the filament feeder comprises:
   a gear to feed the filament; and
   a motor to drive the gear.

14. The 3-dimensional printer according to claim 1, wherein the moving unit further comprises:
   a first timing pulley connected to the first drive motor and a second timing pulley connected to the second drive motor;
   a plurality of idlers disposed at the arm; and
   a timing belt extending around the first and second timing pulleys and the plurality of idlers.

15. The 3-dimensional printer according to claim 14, wherein the moving unit:
   moves the carriage in the first direction by moving the arm in the first direction when the first and second drive motors rotate in the same direction; and
   moves the carriage in the second direction by moving the carriage on the arm in the second direction when the first and second drive motors rotate in the opposite directions.

16. The 3-dimensional printer according to claim 1, wherein:
   the moving unit moves the carriage at least in an x-y plane; and
   the moving unit further comprises an auxiliary moving unit to move the carriage at least in a z-axis direction.

17. The 3-dimensional printer according to claim 1, further comprising:
   an auxiliary moving unit to move, in a z-axis direction, a platform disposed in the cavity to support a model produced by the extruded filament.

* * * * *